United States Patent [19]

Beard

[11] 4,398,323
[45] Aug. 16, 1983

[54] LOCKING DEVICE

[75] Inventor: Michael A. Beard, Birmingham, England

[73] Assignee: DCA Design Consultants Limited, Warwick, England

[21] Appl. No.: 209,463

[22] Filed: Nov. 24, 1980

[30] Foreign Application Priority Data

Dec. 17, 1979 [GB] United Kingdom ................ 7943353

[51] Int. Cl.³ .............................................. A44B 17/00
[52] U.S. Cl. ............................ 24/211 L; 24/230 AT; 24/211 M
[58] Field of Search ......... 24/211 L, 211 M, 230 AT, 24/216, 217 R, 217 W

[56] References Cited

U.S. PATENT DOCUMENTS

| 1,638,321 | 8/1927 | Burmister | 24/211 L |
| 2,590,175 | 3/1952 | Hajdu | 24/211 L |
| 4,099,818 | 7/1978 | Meinzer | 24/230 AT |

FOREIGN PATENT DOCUMENTS

| 667604 | 10/1929 | France | 24/211 R |
| 222598 | 10/1924 | United Kingdom | 24/211 L |

Primary Examiner—Robert A. Hafer
Attorney, Agent, or Firm—Gottlieb, Rackman & Reisman

[57] ABSTRACT

A locking device comprises a locking pin and a base with bore for receiving the locking pin. The base has resilient locking means movable between a locking position where it engages a detent on the pin and an unlocking position. A slide or like means aids movement of the means between the two positions.

10 Claims, 9 Drawing Figures

LOCKING DEVICE

The present invention relates to locking devices.

In particular, the present invention is concerned with locking devices which can be used releasably to anchor or otherwise secure objects by means of tensioning members such as wires, webs, cords, cables, or the like.

According to the present invention there is provided a locking device comprising a locking pin and a base with bore for receiving the locking pin, the base having resilient locking means movable between a locking position where with the pin received in the bore the locking means engages a one of a series of axially spaced detents on the pin to lock the pin against withdrawal from the bore and an unlocking position where the locking means does not so lock the pin, the resilient locking means moving generally radially and/or tangentially with respect to the received pin when moving between the locking and unlocking positions, and means for aiding movement of the resilient locking means between the locking and unlocking positions.

The locking pin can be attached by a tensioning member, e.g. a wire or web, to an object to be secured. When the object is to be secured, the leading end of the locking pin can be inserted into the bore of the base of the locking device, and the resilient locking means allowed to engage with one of the detents on the pin: for release of the object, the resilient locking means is moved to the unlocking position. As described below, the end of the tensioning member remote from the object may form part of the locking pin.

Preferably the locking means is biased towards the locking position. Such bias can suitably be obtained by utilizing the resilience of the locking means. For example, the locking means can comprise a spring arm mounted for generally radial movement with respect to the bore and thus the pin. Such a spring arm can be mounted so as to assume its locking position. In an especially preferred construction the locking means comprises a pair of spring arms, one to either side of the bore, and mounted both to assume locking positions with respective detents on either side of the pin.

Particularly for locking devices of the present invention in which the locking means is biased to the locking position, it is preferred that a forward guide face is associated with each detent of the pin. The guide face can serve to urge the locking means away from engagement with a detent as the locking pin is inserted in to the bore of the base, thereby permitting further insertion of the pin. As the guide face moves beyond the locking means, the locking means can assume or be moved to the locking position to engage with the detent with which the guide face is associated. As appropriate, the pin can then be inserted further still, a succeeding guide face brought in to contact with the resilient means, and thereafter the locking means engaged with the succeeding detent.

A preferred locking pin with a series of detents and associated guide faces can comprise a set of truncated cones with a common axis, the conical faces of the cones forming the guide faces.

If desired the locking pin can be solid, but it is advantageous if the locking pin is flexible. For example it can comprise a series of like members, e.g. truncated cones, threaded on to the end of a cable or other mount and secured in position. The cable or other mount of the locking pin can then be used as the tensioning member to attach the pin to the object to be secured.

The means for moving the resilient locking means can conveniently be a slide which moves perpendicularly with respect to the bore in the base. Suitably the base is configured so as to retain the slide while guiding the movement of the slide. The locking means can be carried by the slide or fixed on the base. By way of example, the locking means can be carried on the slide and move between its locking and unlocking positions by reaction against a bearing surface fixed on the base. Alternatively, the slide can have cam faces which engage with resilient locking means mounted on the base. In general, upon movement of the slide in a first direction the locking means moves or is moved from the locking to the unlocking position. Upon movement of the slide in the reverse or second direction, the locking means can move or is moved back to the locking position.

Locking devices in accordance with the present invention can readily be designed so as to provide a quick-release action, whereby the locking pin and thus the secured object can rapidly be freed from the base of the locking device. It is a particular advantage of the present locking devices that they permit tensioning of the tensioning member between an object to be secured and the base of the locking device. If there is insufficient tension, and provided that the locking pin has not been inserted to the maximum extent into the base, then the pin can be further inserted and the locking means engaged with a succeeding detent of the locking pin.

Locking devices of the invention may be constructed for a wide variety of applications. For instance, they may be used to secure an oxygen mask to the flying helmet of military aircrew, or, again for military aircrew, they may be used to prevent unwanted movement of the limbs of the crew.

Embodiments of the present invention will now be described by way of example with reference to the accompanying drawings, in which.

Figure 1:
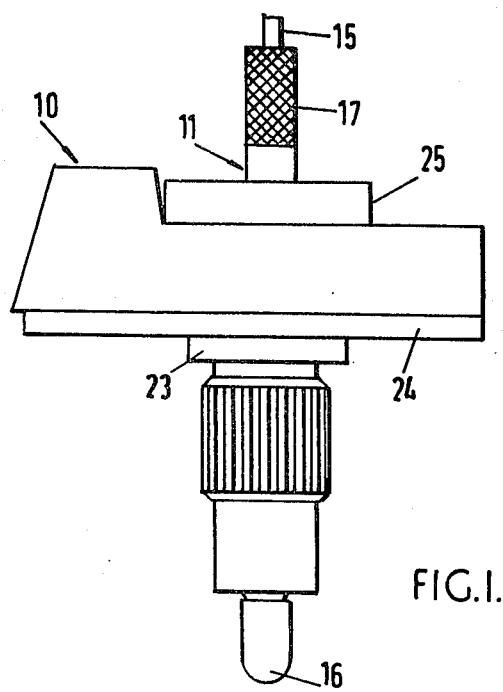
FIG. 1 is a side view of a first locking device in accordance with the present invention.
Figure 2:
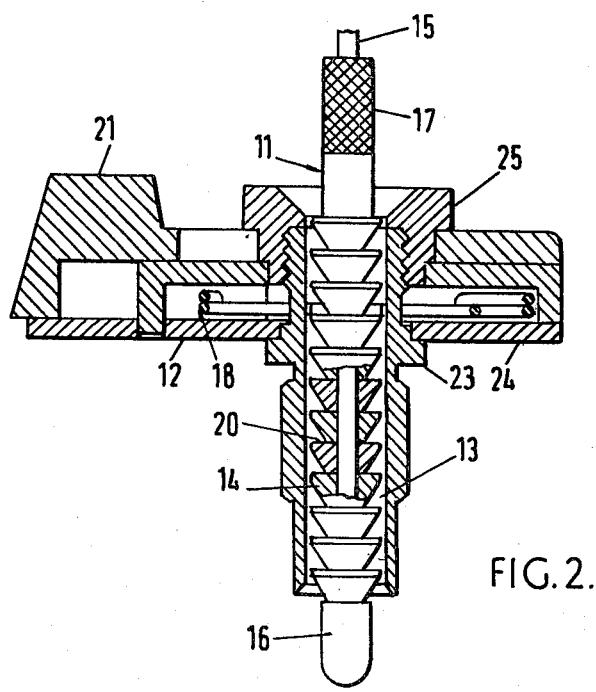
FIG. 2 is a vertical section of the locking device of FIG. 1 when in the locking position.
Figure 3:
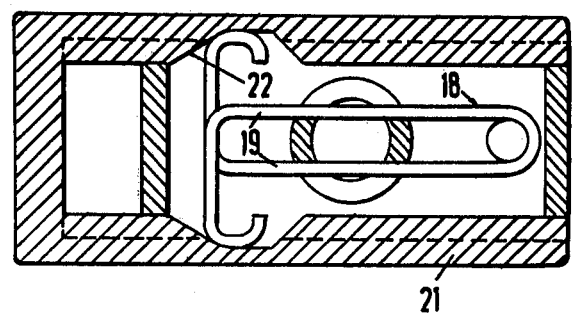
FIG. 3 is a horizontal section of part of the locking device of FIG. 1 when in the locking position of FIG. 2.
Figure 4:
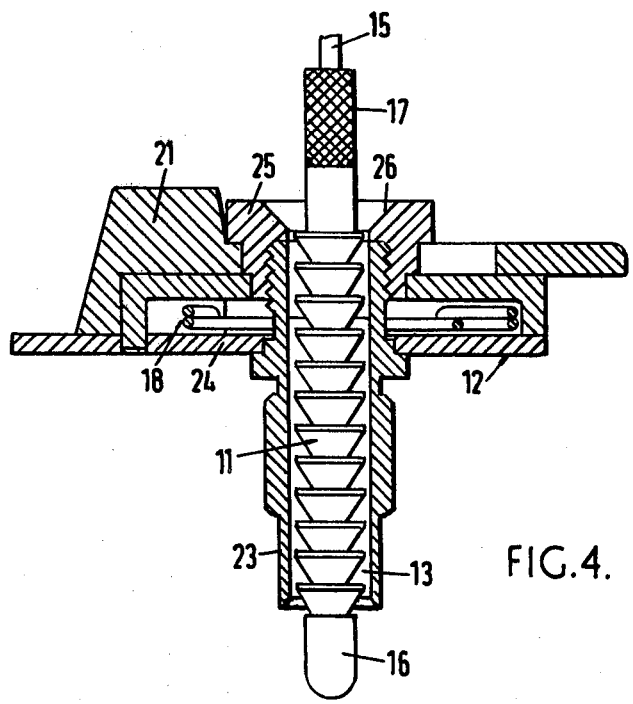
FIG. 4 is a vertical section similar to FIG. 2 but with the locking device in the unlocking position.
Figure 5:
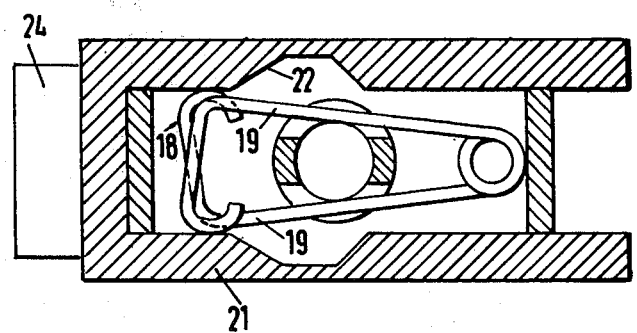
FIG. 5 is a horizontal section similar to FIG. 3 but with the locking device in the unlocking position.

Referring first to FIGS. 1 to 5 of the drawings, a locking device 10 comprises a locking pin 11 and base 12 with bore 13 for receiving the locking pin 11. The locking pin 11 is formed of a series of truncated cones 14 turned from stainless steel and threaded on to one end of a wire cable 15 against an end tip 16 crimped in place. A finger grip 17 is crimped on to the cable 15, behind the cones 14. As an overall result, the locking pin is generally flexible and easily manipulated, even by gloved aircrew.

The base 12 has resilient locking means in the form of a locking spring 18 of spring steel. The spring has a pair of spring arms 19 which are movable between a locking position (FIGS. 2 and 3) where they prevent withdrawal of the pin, and an unlocking position (FIGS. 4 and 5) where they do not prevent such withdrawal. For the locking position and with the pin 11 received in the bore 13, the arms 19 engage a one of a series of axially spaced detents 20 formed by the truncated cones 14 and thus effect the desired locking of the pin. The spring arms 19 are mouned to assume the locking position, and move radially away from the pin 11 in order to gain the unlocking position.

A slide 21 is provided to move the spring arms 19 from the locking to the unlocking position. This slide 21 has cam faces 22 which engage with the spring 18 and move the arms 19 radially away from the locking pin as the slide moves. Suitably the slide 21 is of moulded acetal plastics material and is shaped so as to be a prominent feature of the locking device to permit rapid actuation thereof.

In the embodiment shown in FIGS. 1 to 5 of the drawings, the base 12 comprises a guide post 23 turned from stainless steel, a base plate 24 of pressed steel, and a clamping nut 25 which screws in to position. The nut 25 bottoms on the guide post, holds together the components of the base, and has a chamfer face 26 forming a guide for guiding insertion of the locking pin 11.

The base 11 is mounted on a surface to which an object is to be anchored. For example, the bases can be mounted in pairs on a flying helmet in order to permit an oxygen mask to be releasably secured in position on the helmet. The free end of the cable 15 is attached to the object, eg oxygen mask. With the slide 21 in the position where the spring arms are held apart, the locking device is then ready for use.

In use, the locking pin 11 is inserted in to the bore 13 of the guide post 23. As the pin is inserted, the conical faces of the cones 14 act as guide faces and prise apart the spring arms 19, thereby facilitating further insertion of the pin. As each guide face is inserted beyond the spring arms, the arms partially engage with a detent 20 and the pin is held in place. If desired, the pin can be further inserted to increase the tension on the object, with the arms engaging with a succeeding detent 20. Once the desired degree of tension has been obtained, the slide 21 is slid across the base plate 24 to move the spring arms to the locking position.

The embodiment of FIGS. 1 to 5 has the advantage that even with the spring arms in the unlocking position, nevertheless the pin 11 cannot fall out of the bore 13. Only by application of sufficient force to the cable is the pin released from the bore. This effect is achieved because with the arms in the unlocking position their spacing in the vicinity of the pin is less than the diameter of the pin.

Turning now to FIGS. 6 to 9 of the drawings there is shown a second locking device in accordance with the invention. This second locking device represents the currently preferred construction.

The manufacture and use of the second locking device 110 has much in common with that for the first locking device, and it is only necessary to point to significant differences. Thus, the locking pin 111 is of substantially the same construction as the locking pin 11 of the previous figures and further description is otiose.

Figure 6:
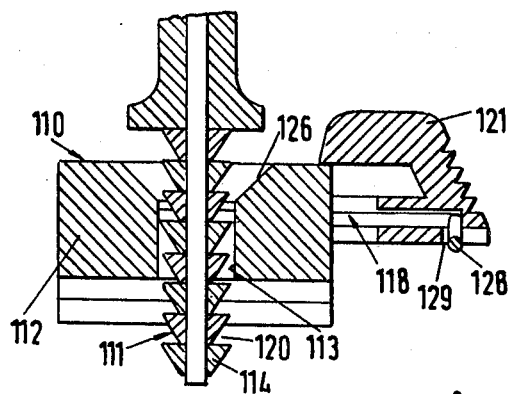
FIG. 6 is a vertical section of a second locking device in accordance with invention and in the locking position.
Figure 7:
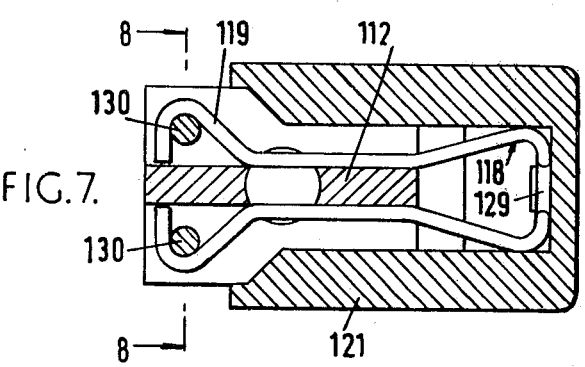
FIG. 7 is a horizontal section of part of the second locking device when in the locking position of FIG. 6.
Figure 9:
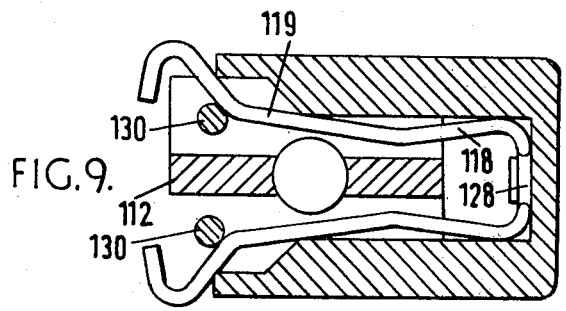
FIG. 9 is a horizontal section similar to FIG. 7 but with the second locking device in the unlocking position.

In the second locking device there is a slide 121 which can move relative to a base 112 between the locking position of FIGS. 6 and 7 and the unlocking position of FIG. 9. A spring 118 with a pair of spring arms 119 has a kink 128 at the root of the arms. This kink 128 is received in an opening 129 of the slide, and thus the spring 118 is movable with the slide 121.

Provided on the base 112 are a pair of grub screws 130 which fulfil two purposes. Firstly they provide bearing surfaces against which the spring arms 119 may act: the spring is made such that the arms are biased to the locking position of FIGS. 6 and 7. Thus when the device is in the position of FIG. 9 the arms bear against the screws 130 in a manner which tends to restore the locking position.

Figure 8:
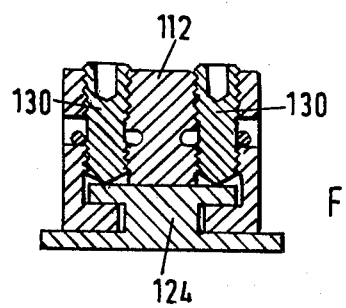
FIG. 8 is a vertical section taken on the line 8—8 of FIG. 7.

Secondly, the screws can be tightened so as to secure the base 112 to a base plate 124 received within the bottom of the base. The base plate 124 is shown in FIG. 8 but for clarity is omitted from the FIGS. 6, 7 and 9.

In use, the locking pin 111 is inserted in to bore 113 of the base 112, guidance being given by conically chamfered face 126 of the base. As with the first embodiment, the conical faces of the cones 114 act as guide faces and prise apart the spring arms 119 from the position of FIGS. 6 and 7. The pin 111 is then inserted until sufficient tension is obtained.

The second embodiment has the advantage that the spring 118 biases the slide 121 to the locking position of FIGS. 6 and 7. Hence the pin 111 is retained in the bore 113, and only by positive unlocking movement of the slide can the pin be released.

Further advantages of the described embodiments reside in their quick and reliable action, robust construction and wide applicability.

I claim:

1. A locking device for releasably securing members under tension, comprising an elongate locking pin with a series of axially spaced transverse detent surfaces disposed along the pin, an anchoring base provided with a bore for through passage of the said locking pin, said base extending in a plane transverse to the axis of said bore, a slide mounted on said base and slidable in a transverse direction relative to said axis, locking spring arm means provided on the slide and movable by sliding thereof between a locking position and an unlocking position, the locking spring arm means when in the said locking position engaging a selected one of the said detent surfaces of the locking pin when said pin is inserted in the said bore thereby to lock the said pin against withdrawal from the bore, the locking spring arm means when in the unlocking position being disengaged from the said detent surfaces, and abutment means on said base and engaging said locking spring arm means for moving the latter between a pin-engaging position and disengaged position on movement of the slide and locking spring means between said locking and unlocking positions respectively, said abutment means providing a reaction biasing the spring arm means and slide towards the locking position.

2. The device of claim 1 in which said abutment means comprises fixing screws for fixing the base in position.

3. The locking device of claim 1, in which said locking means comprise a spring arm, said spring arm being mounted for generally radial movement with respect to said bore of said base.

4. The locking device of claim 3, wherein said locking means comprises a pair of spring arms, one to either side of the bore, said pair being mounted to assume locking positions with respective detents on either side of said bore.

5. The locking device of claim 1, wherein said locking pin has a forward guide face associated with each of its detents.

6. The locking device of claim 5, in which said locking pin includes a set of truncated cones with a common axis and the conical faces of said cones form said guide faces.

7. The locking device of claim 1, in which said locking pin is flexible.

8. The locking device of claim 1, in which said means for moving the resilient locking means is a slide which can move perpendicularly with respect to said bore.

9. The locking device of claim 8, in which said resilient locking means is mounted on one of said base and said slide and is urged from its unlocking to its locking position by reaction against a bearing surface provided on the other of said base and said slide.

10. The locking device of claim 9, in which said bearing surface is a grub screw in said base.

* * * * *